US010429637B2

(12) United States Patent
Morita et al.

(10) Patent No.: US 10,429,637 B2
(45) Date of Patent: Oct. 1, 2019

(54) ELECTRO-OPTICAL DEVICE AND ELECTRONIC DEVICE

(71) Applicant: SEIKO EPSON CORPORATION, Tokyo (JP)

(72) Inventors: Kikuya Morita, Suwa (JP); Takunori Iki, Azumino (JP); Yoichi Momose, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 260 days.

(21) Appl. No.: 15/584,760

(22) Filed: May 2, 2017

(65) Prior Publication Data
US 2017/0336622 A1 Nov. 23, 2017

(30) Foreign Application Priority Data

May 23, 2016 (JP) ................................. 2016-102176

(51) Int. Cl.
| | |
|---|---|
| G02B 26/08 | (2006.01) |
| G02B 26/10 | (2006.01) |
| G03B 21/00 | (2006.01) |
| H04N 5/74 | (2006.01) |
| H04N 9/31 | (2006.01) |
| G02B 6/35 | (2006.01) |
| G02B 17/00 | (2006.01) |
| G02B 27/00 | (2006.01) |

(Continued)

(52) U.S. Cl.
CPC ....... *G02B 26/0841* (2013.01); *G02B 26/105* (2013.01); *G03B 21/008* (2013.01); *H04N 5/7458* (2013.01); *H04N 9/3111* (2013.01); *G02B 6/3518* (2013.01); *G02B 17/006* (2013.01); *G02B 26/0816* (2013.01); *G02B 27/0068* (2013.01); *G02B 27/0977* (2013.01); *G09G 3/346* (2013.01)

(58) Field of Classification Search
CPC .............. G02B 26/0841; G02B 26/105; G02B 6/3518; G02B 27/0977; G02B 17/006; G02B 26/0816; G02B 27/0068
See application file for complete search history.

(56) References Cited

U.S. PATENT DOCUMENTS

| | | | |
|---|---|---|---|
| 5,142,405 A * | 8/1992 | Hornbeck | .......... G02B 26/0833 |
| | | | 348/E3.012 |
| 6,232,936 B1 | 5/2001 | Gove et al. | |

(Continued)

FOREIGN PATENT DOCUMENTS

| | | |
|---|---|---|
| JP | H08-036141 A | 2/1996 |
| JP | 2009-503588 A | 1/2009 |
| WO | 2007-016444 A2 | 2/2007 |

*Primary Examiner* — Joseph P Martinez
(74) *Attorney, Agent, or Firm* — Oliff PLC

(57) ABSTRACT

An electro-optical device includes a mirror being positioned above a surface of a substrate and modulating light, and a torsion hinge being positioned between the mirror and the substrate and pivotably supporting the mirror. The electro-optical device includes beam portions being disposed between the mirror and the substrate at positions that do not overlap the mirror in plan view, and being supported by the substrate while being spaced away from the mirror and the substrate. Spring tips that regulate a pivot range of the mirror protrude from the beam portions toward positions that overlap the mirror in plan view.

22 Claims, 12 Drawing Sheets

(51) Int. Cl.
    *G02B 27/09*     (2006.01)
    *G09G 3/34*     (2006.01)

(56) References Cited

U.S. PATENT DOCUMENTS

| | | |
|---|---|---|
| 7,139,113 B1 | 11/2006 | Chu et al. |
| 2015/0070749 A1 | 3/2015 | McDonald et al. |

* cited by examiner

ABSTRACT# ELECTRO-OPTICAL DEVICE AND ELECTRONIC DEVICE

BACKGROUND

1. Technical Field

The present invention relates to an electronic device and an electro-optical device that modulate light emitted from a light source unit by mirrors.

2. Related Art

As an electronic device including mirrors, there is proposed a display device in which light emitted from a light source unit is modulated by an electro-optical device called a digital micromirror device (DMD) and then the modulated light is projected in an enlarged manner by a projection optical system. In this electronic device, the electro-optical device includes a substrate and a plurality of light-modulation mirrors positioned above a surface of the substrate while being spaced away from the substrate. A torsion hinge that pivotably supports the mirror, address electrodes, and a bias electrode are provided between each of the plurality of mirrors and the substrate in a region that overlaps the mirror in plan view. Thus, when address voltages are supplied to the address electrodes while a bias voltage is supplied from the bias electrode to the mirror via the torsion hinge, electrostatic forces are supplied between the mirror and the address electrodes and therefore the posture of the mirror can be switched between an ON posture in which the light from the light source unit is reflected in an ON direction toward the projection optical system and an OFF posture in which the light from the light source unit is reflected in an OFF direction different from the ON direction. Accordingly, the light from the light source unit can be modulated (see US 2015/0070749 A1). Beam portions supported by the substrate are provided in the region that overlaps the mirror and spring tips are provided at the ends of each beam portion. Thus, when the mirror has pivoted, the mirror is brought into abutment against the spring tips of the beam portions provided at the positions that overlap the mirror in plan view, thereby regulating a pivot range of the mirror.

In order to expand the pivot range of the mirror, it is preferred that the spring tips be provided at the edges of a unit mirror portion in which the mirror is arranged. In the region that overlaps the mirror in plan view, however, the torsion hinge, the address electrodes, and the like are provided in addition to the beam portions. Therefore, there is a significant limitation on the layout of the beam portions and the spring tips. In the case of the structure in which the mirror is brought into abutment against the spring tips of the beam portions provided at the positions that overlap the mirror in plan view as described in US 2015/0070749 A1, there is a problem, for example, in that the spring tips cannot be provided at appropriate positions.

SUMMARY

An advantage of some aspects of the invention is that an electro-optical device and an electronic device in which the degrees of freedom in terms of layout of, for example, spring tips that regulate a pivot range of a mirror can be increased are provided.

An electro-optical device according to an aspect of the invention includes a mirror being positioned above a surface of a substrate and modulating light, a torsion hinge being positioned between the mirror and the substrate, and supporting the mirror such that the mirror is pivotable about an axis, a beam portion being disposed between the mirror and the substrate at a position that does not overlap the mirror in plan view, and being supported by the substrate while being spaced away from the mirror and the substrate, and a spring tip protruding from the beam portion toward a position that overlaps the mirror in plan view, and regulates a pivot range of the mirror.

In this aspect of the invention, the pivot range of the mirror is regulated by causing the spring tip to protrude to the position that overlaps the mirror in plan view from the beam portion provided in the region that does not overlap the mirror in plan view. Therefore, the degrees of freedom in terms of layout of the spring tip and the like can be increased compared with the structure in which the spring tip that is provided at the beam portion provided in the region that overlaps the mirror in plan view is brought into abutment against the mirror. Accordingly, advantages are attained, for example, in that the pivot range of the mirror can be expanded.

In this case, there may be employed an embodiment in which the electro-optical device further includes an address electrode being provided between the mirror and the substrate at a position that overlaps the mirror in plan view, and supplying an electrostatic force between the address electrode and the mirror to pivot the mirror about the axis, and a bias electrode being provided between the torsion hinge and the substrate, and supplying a bias voltage to the mirror via the torsion hinge.

In this case, there may be employed an embodiment in which the torsion hinge and the beam portion are formed of the same layer.

In this case, there may be employed an embodiment in which the address electrode includes a substrate-side address electrode that is provided on the substrate, and an elevated address electrode that is provided between the substrate-side address electrode and the mirror. According to this embodiment, the electrostatic force to be supplied between the mirror and the address electrode can be increased. Also in this case, the degrees of freedom in terms of layout of the spring tip can be increased in this embodiment, and therefore the spring tip hardly hinders the elevated address electrode from being provided over a wide range at an appropriate position.

In this case, there may be employed an embodiment in which the beam portion and the elevated address electrode are formed of the same layer, and a distance between the axis and the spring tip is longer than a distance between the axis and a part of the elevated address electrode which is spaced farthest away from the axis. According to this embodiment, even when the beam portion and the elevated address electrode are formed of the same layer, the mirror is brought into abutment against the spring tip without interfering with the elevated address electrode when the mirror has pivoted.

In this case, there may be employed an embodiment in which the elevated address electrode includes a lower-stage elevated address electrode that is provided between the substrate-side address electrode and the mirror, and an upper-stage elevated address electrode that is provided between the lower-stage elevated address electrode and the mirror. According to this embodiment, the electrostatic force to be supplied between the mirror and the address electrode can be increased. Also in this case, the degrees of freedom in terms of layout of the spring tip can be increased in this embodiment, and therefore the spring tip hardly hinders the elevated address electrode from being provided over a wide range at an appropriate position.

In this case, there may be employed an embodiment in which the mirror, the torsion hinge, and the beam portion are provided in each of a plurality of unit mirror portions that are arranged in a first direction and a second direction intersecting the first direction, in each of the plurality of unit mirror portions, the beam portion of an adjacent unit mirror portion is present at a position that does not overlap the mirror in plan view, and in each of the plurality of unit mirror portions, the spring tip protrudes toward a position that overlaps the mirror in plan view from any one of the beam portion provided in a unit mirror portion which is adjacent on one side of the first direction, the beam portion provided in a unit mirror portion which is adjacent on another side of the first direction, the beam portion provided in a unit mirror portion which is adjacent on one side of the second direction, and the beam portion provided in a unit mirror portion which is adjacent on another side of the second direction. According to this embodiment, the beam portion that overlaps the mirror in plan view and the beam portion that does not overlap the mirror in plan view (beam portion of an adjacent unit mirror portion) are present for each single mirror, and therefore the pivot range of the mirror can be regulated by the spring tip provided at the beam portion that does not overlap the mirror in plan view.

In this case, there may be employed an embodiment in which, in plan view, the axis passes through a first corner portion of the mirror which is located on the one side of the first direction and the another side of the second direction and a second corner portion of the mirror which is located on the another side of the first direction and the one side of the second direction.

In this case, there may be employed an embodiment in which the beam portion includes a first beam portion extending in the second direction along an edge of the mirror on the one side of the first direction, a second beam portion extending in the first direction along an edge of the mirror on the another side of the second direction, a third beam portion extending in the second direction along an edge of the mirror on the another side of the first direction, and a fourth beam portion extending in the first direction along an edge of the mirror on the one side of the second direction. According to this embodiment, the spring tip can be caused to protrude from an appropriate position on the unit mirror portion.

In this case, there may be employed an embodiment in which each of the first beam portion, the second beam portion, the third beam portion, and the fourth beam portion is supported on the substrate by support posts at least at two positions spaced away from each other in an extending direction, and the spring tip protrudes from a part of each of the first beam portion, the second beam portion, the third beam portion, and the fourth beam portion which is located between the support posts or is supported by the support post. According to this embodiment, deformation of the beam portion can be suppressed when the mirror and the spring tip are brought into abutment against each other.

In this case, there may be employed an embodiment in which the first beam portion and the second beam portion are coupled to each other at a first bent portion that overlaps the first corner portion in plan view, and the third beam portion and the fourth beam portion are coupled to each other at a second bent portion that overlaps the second corner portion in plan view, each of the first beam portion, the second beam portion, the first bent portion, the third beam portion, the fourth beam portion, and the second bent portion is supported on the substrate by a support post, and the spring tip protrudes from a part located between the support post of the first beam portion and the support post of the first bent portion, a part located between the support post of the second beam portion and the support post of the first bent portion, a part located between the support post of the third beam portion and the support post of the second bent portion, a part located between the support post of the fourth beam portion and the support post of the second bent portion, or a part supported by the support post. According to this embodiment, deformation of the beam portion can be suppressed when the mirror and the spring tip are brought into abutment against each other.

In this case, there may be employed an embodiment in which, in each of the plurality of unit mirror portions, a first spring tip that regulates, as the spring tip, a pivot range of the mirror in one direction about the axis protrudes toward the position that overlaps the mirror in plan view from each of the third beam portion of the unit mirror portion which is adjacent on the one side of the first direction and the second beam portion of the unit mirror portion which is adjacent on the one side of the second direction, and a second spring tip that regulates, as the spring tip, a pivot range of the mirror in another direction about the axis protrudes toward the position that overlaps the mirror in plan view from each of the first beam portion of the unit mirror portion which is adjacent on the another side of the first direction and the fourth beam portion of the unit mirror portion which is adjacent on the another side of the second direction.

In this case, there may be employed an embodiment in which, in each of the plurality of unit mirror portions, a first spring tip that regulates, as the spring tip, a pivot range of the mirror in one direction about the axis protrudes toward the position that overlaps the mirror in plan view from each of the second bent portion of the unit mirror portion which is adjacent on the one side of the first direction and the first bent portion of the unit mirror portion which is adjacent on the one side of the second direction, and a second spring tip that regulates, as the spring tip, a pivot range of the mirror in another direction about the axis protrudes toward the position that overlaps the mirror in plan view from each of the first bent portion of the unit mirror portion which is adjacent on the another side of the first direction and the second bent portion of the unit mirror portion which is adjacent on the another side of the second direction.

In this case, there may be employed an embodiment in which, in each of the plurality of unit mirror portions, a first spring tip that regulates, as the spring tip, a pivot range of the mirror in one direction about the axis protrudes toward the position that overlaps the mirror in plan view from a first coupling portion that couples the second bent portion of the unit mirror portion which is adjacent on the one side of the first direction to the first bent portion of the unit mirror portion which is adjacent on the one side of the second direction, and a second spring tip that regulates, as the spring tip, a pivot range of the mirror in another direction about the axis protrudes toward the position that overlaps the mirror in plan view from a second coupling portion that couples the first bent portion of the unit mirror portion which is adjacent on the another side of the first direction to the second bent portion of the unit mirror portion which is adjacent on the another side of the second direction.

In this case, there may be employed an embodiment in which each of a width of the first coupling portion and a width of the second coupling portion is smaller than a width of the torsion hinge.

In this case, there may be employed an embodiment in which each of a third corner portion of the mirror which is located on the one side of the first direction and the one side of the second direction and a fourth corner portion of the mirror which is located on the another side of the first direction and the another side of the second direction is chamfered into a round shape. This embodiment prevents the occurrence of a case in which a sharp portion of the mirror is brought into abutment against the spring tip. Thus, deformation of the corner portion of the mirror and the spring tip can be suppressed.

In this case, there may be employed an embodiment in which the axis includes a first axis extending in the first direction while overlapping the mirror in plan view, and a second axis extending in the second direction while overlapping the mirror in plan view.

In this case, there may be employed an embodiment in which the beam portion includes a first beam portion extending in the second direction along an edge of the mirror on the one side of the first direction, and a second beam portion extending in the first direction along an edge of the mirror on the one side of the second direction. According to this embodiment, a plurality of spring tips can be caused to protrude from appropriate positions on the unit mirror portion.

In this case, there may be employed an embodiment in which each of the first beam portion and the second beam portion is supported on the substrate by support posts at least at two positions spaced away from each other in an extending direction, and the spring tip protrudes from a part of each of the first beam portion and the second beam portion which is located between the two support posts or is supported by the support post. According to this embodiment, deformation of the beam portion can be suppressed when the mirror and the spring tip are brought into abutment against each other.

In this case, there may be employed an embodiment in which, in each of the plurality of unit mirror portions, a first spring tip that regulates, as the spring tip, a pivot range of the mirror in one direction about the first axis protrudes toward the position that overlaps the mirror in plan view from the second beam portion of the unit mirror portion which is adjacent on the another side of the second direction, and a second spring tip that regulates, as the spring tip, a pivot range of the mirror in one direction about the second axis protrudes toward the position that overlaps the mirror in plan view from the first beam portion of the unit mirror portion which is adjacent on the another side of the first direction.

The electro-optical device according to the aspect of the invention may be used for various electronic devices. When the electronic device is constructed as a projection-type display device, the electronic device includes a light source unit that radiates light onto the mirror, and a projection optical system that projects modulated light output from the electro-optical device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
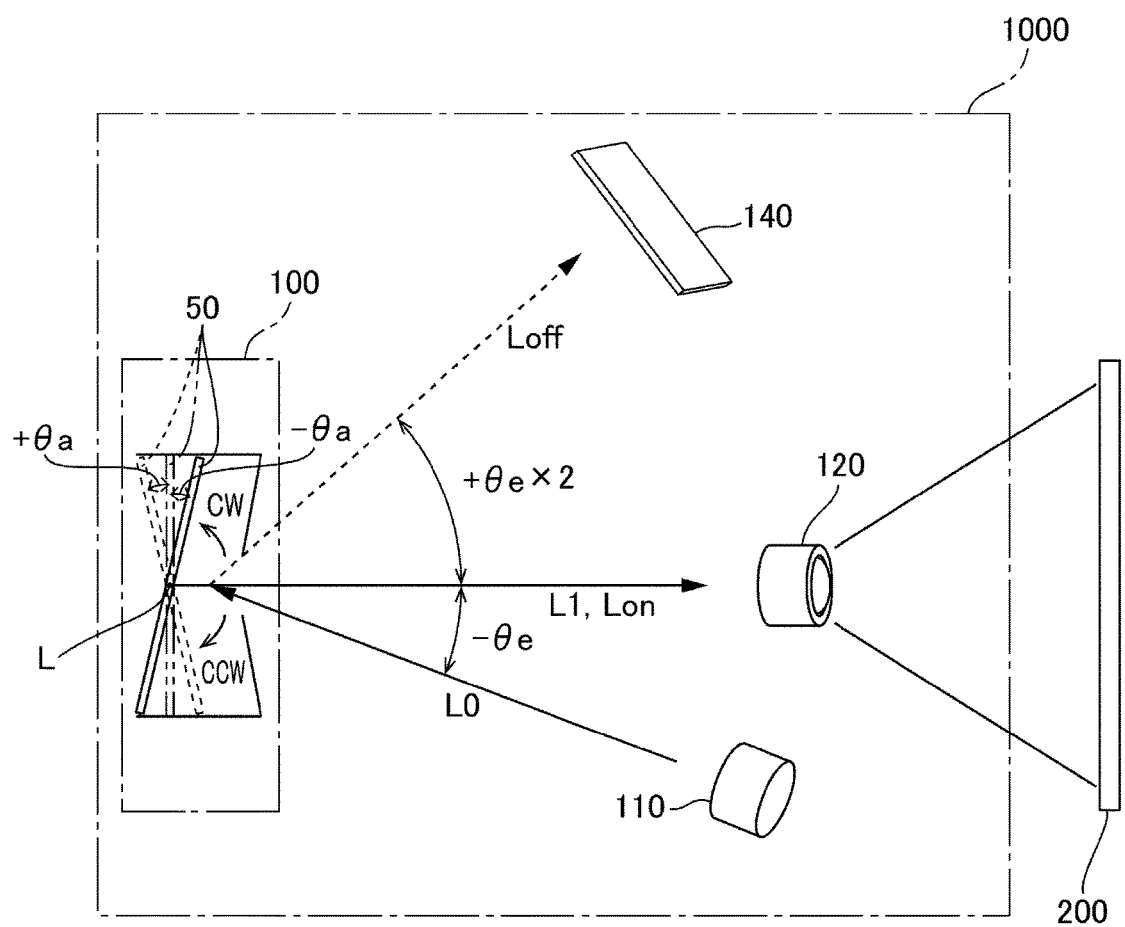
FIG. 1 is an explanatory view of an electronic device (projection-type display device) to which the invention is applied.

Embodiments of the invention are described with reference to the drawings. In the drawings that are referred to in the following description, respective layers and members are illustrated on different scales so that the respective layers and members are illustrated in sizes large enough to be recognizable in the drawings. The numbers of mirrors and the like illustrated in the drawings are set so that the mirrors and the like are illustrated in sizes large enough to be recognizable in the drawings, but the numbers of mirrors and the like to be provided may be set larger than the numbers of mirrors and the like illustrated in the drawings.

First Embodiment

Overall Structure of Electronic Device 1000

FIG. 1 is an explanatory view of an electronic device 1000 (projection-type display device) to which the invention is applied. FIG. 1 illustrates only one of a plurality of mirrors 50 provided in an electro-optical device 100. FIG. 1 illustrates a steady posture of the mirror 50 by a two-dot chain line, an ON posture by a solid line, and an OFF posture by a dotted line.

The electronic device 1000 illustrated in FIG. 1 includes a light source unit 110 and the electro-optical device 100 that modulates light radiated from the light source unit 110 based on image information. Further, the electronic device 1000 includes a projection optical system 120 that projects the light as a projection image modulated by the electro-optical device 100 onto a projection plane 200 such as a wall or a screen. Thus, the electronic device 1000 serves as a projection-type display device. The light source unit 110 sequentially emits red light, green light, and blue light. The electro-optical device 100 sequentially performs light modulation on the red light, the green light, and the blue light and outputs the modulated light to the projection optical system 120. In this manner, a color image can be displayed.

For example, a structure in which white light emitted from a light source is output to the electro-optical device 100 through a color filter (not shown) may be employed for the light source unit 110. Further, a structure in which red light, green light, and blue light are sequentially emitted by sequentially turning on a light emitting element that emits red light, a light emitting element that emits green light, and a light emitting element that emits blue light may be employed for the light source unit 110. In any case, the electro-optical device 100 modulates incident light in synchronization with a timing when the light source unit 110 emits red light, green light, and blue light.

Basic Structure of Electro-Optical Device 100

Figure 2:
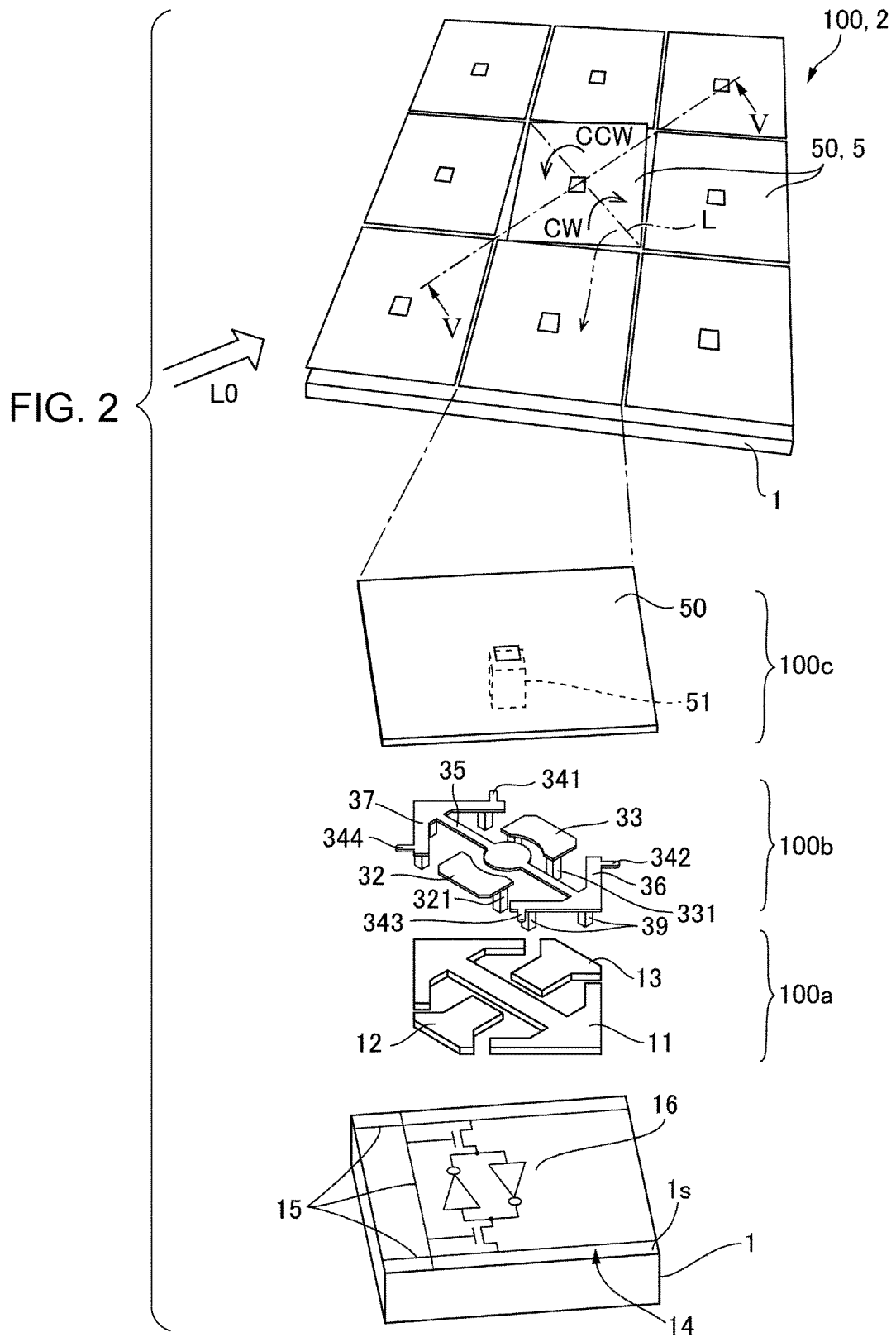
FIG. 2 is an explanatory view schematically illustrating an example of the basic structure of an electro-optical device illustrated in FIG. 1.
Figure 3:
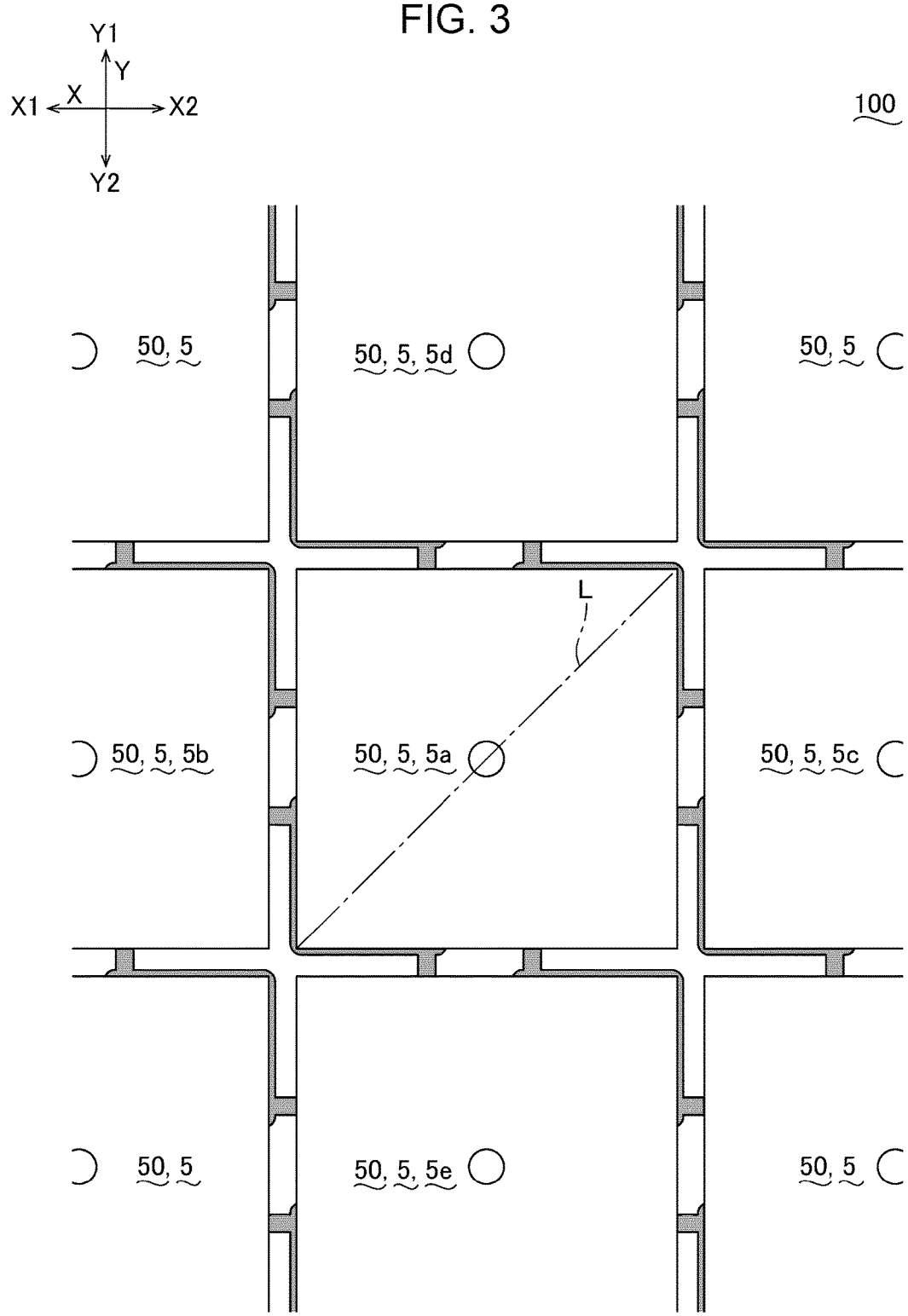
FIG. 3 is an explanatory view schematically illustrating the planar structure of the electro-optical device according to a first embodiment of the invention.
Figure 4:
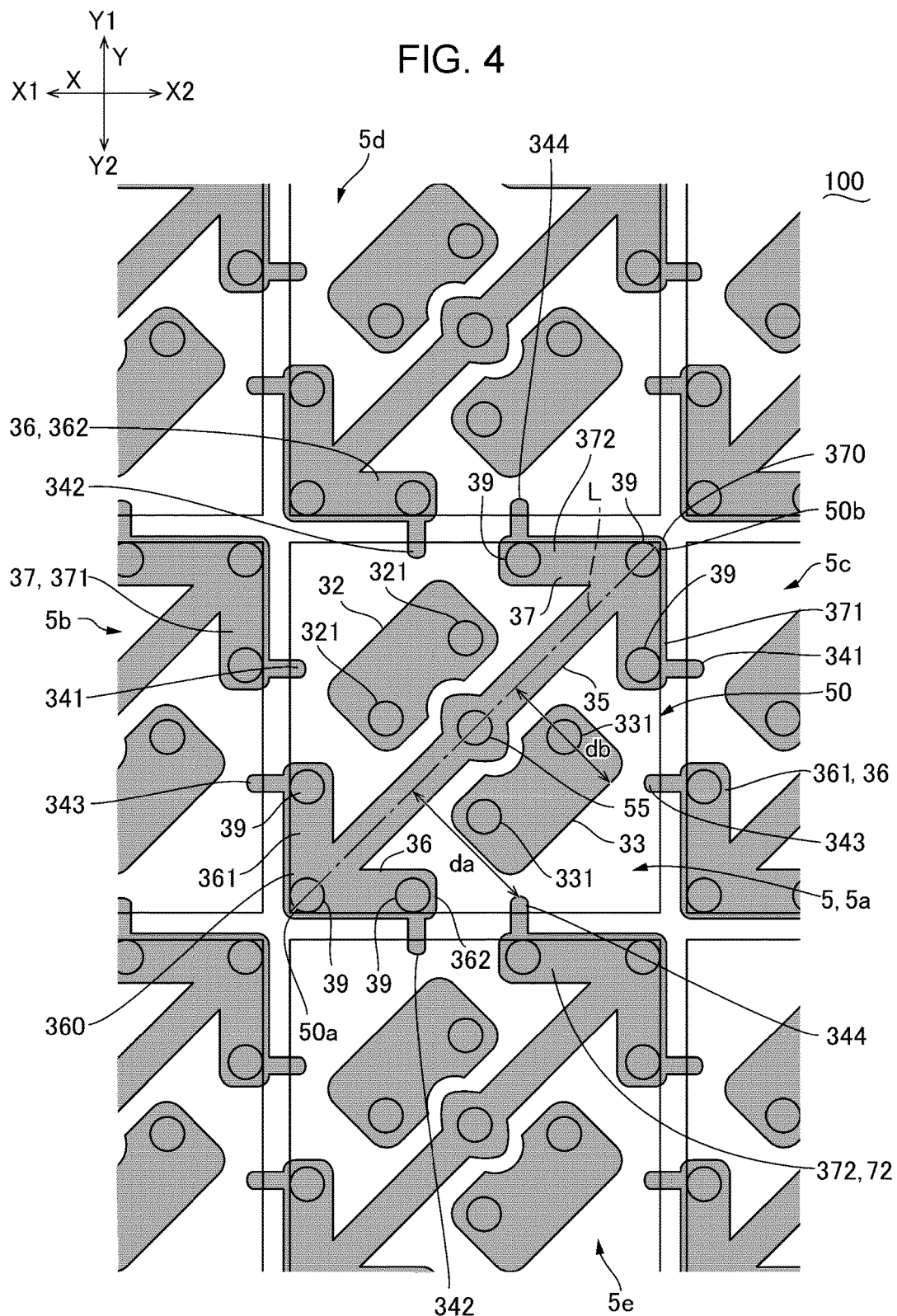
FIG. 4 is an explanatory view of beam portions and the like of the electro-optical device according to the first embodiment of the invention.
Figure 5:
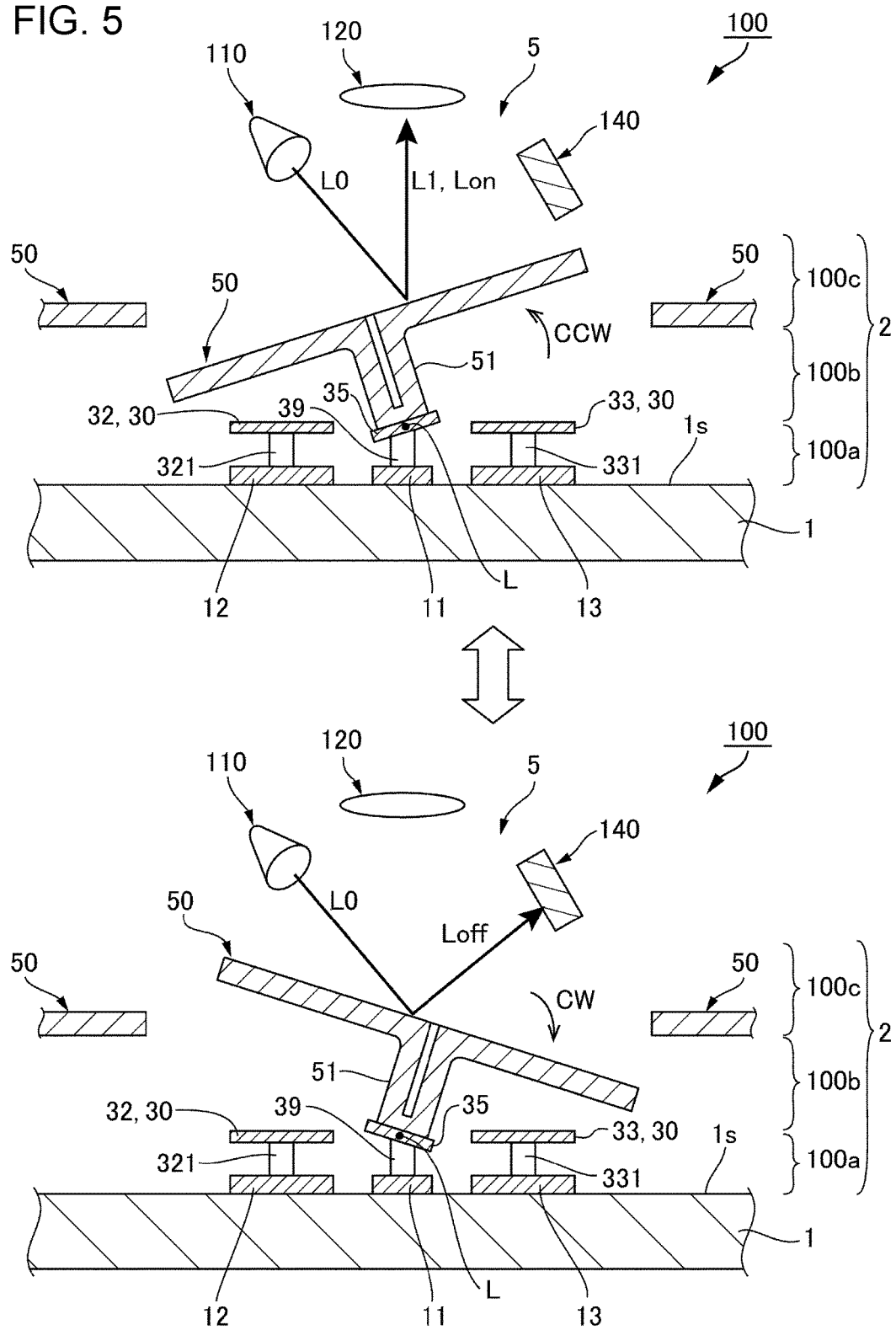
FIG. 5 is an explanatory view schematically illustrating a cross section around a mirror of the electro-optical device, which is taken along the line V-V of FIG. 2.

FIG. 2 is an explanatory view schematically illustrating an example of the basic structure of the electro-optical device 100 illustrated in FIG. 1. FIG. 2 also illustrates a state in which the electro-optical device 100 is partially exploded. FIG. 3 is an explanatory view schematically illustrating the planar structure of the electro-optical device 100 according to the first embodiment of the invention. FIG. 4 is an explanatory view of beam portions 36 and 37 and the like of the electro-optical device 100 according to the first embodiment of the invention. FIG. 4 is a plan view illustrating the mirror 50 by a quadrangular contour line alone. FIG. 5 is an explanatory view schematically illustrating a cross section around the mirror 50 of the electro-optical device 100, which is taken along the line V-V of FIG. 2. FIG. 5 illustrates the ON posture of the mirror 50 that is tilted in a direction CCW about an axis L and the OFF posture of the mirror 50 that is tilted in another direction CW about the axis L.

As illustrated in FIG. 2, FIG. 3, FIG. 4, and FIG. 5, the electro-optical device 100 includes a chip 2 having the plurality of light-modulation mirrors 50 positioned above a surface 1s of a substrate 1. In the chip 2, the mirror 50 is spaced away from the surface 1s of the substrate 1. The part where a mirror 50 is arranged is a unit mirror portion 5. In this embodiment, the unit mirror portions 5 are arranged in matrix in a first direction X and a second direction Y.

The substrate 1 is, for example, a silicon substrate. The mirror 50 is formed of a reflective metal film such as aluminum. The thickness of the mirror 50 is 1 μm or less, for example, 0.3 μm. The mirror 50 is a micro-mirror having a planar shape of, for example, 10 to 30 μm on each side. The mirrors 50 are arranged in an array of, for example, 800×600 to 11920×1080, and one mirror 50 (unit mirror portion 5) corresponds to one pixel of the projection image.

As illustrated in FIG. 5, in the electro-optical device 100, the chip 2 includes a first level portion 100a including, for example, a substrate-side bias electrode 11 and substrate-side address electrodes 12 and 13 (address electrodes) formed on the surface 1s of the substrate 1, a second level portion 100b including elevated address electrodes 32 and 33 (address electrodes) and a torsion hinge 35, and a third level portion 100c including the mirror 50. In the first level portion 100a, an address circuit 14 is formed on the substrate 1. The address circuit 14 includes a memory cell for selectively controlling an operation of each mirror 50, wires 15 such as word lines and bit lines, and the like. The address circuit 14 has a circuit structure similar to that of a random access memory (RAM) including a CMOS circuit 16.

The second level portion 100b is provided with the elevated address electrodes 32 and 33, the hinge 35, and a mirror support post 51. The elevated address electrodes 32 and 33 are electrically connected to the substrate-side address electrodes 12 and 13 via electrode support posts 321 and 331 and are supported by the substrate 1 via the electrode support posts 321 and 331 and the substrate-side address electrodes 12 and 13, respectively. The beam portions 36 and 37 extend from both ends of the hinge 35. The beam portions 36 and 37 are electrically connected to the substrate-side bias electrode 11 via support posts 39 and are supported by the substrate 1 via the support posts 39 and the substrate-side bias electrode 11. The mirror 50 is electrically connected to the hinge 35 via the mirror support post 51 and is supported by the hinge 35. Thus, the mirror 50 is electrically connected to the substrate-side bias electrode 11 via the mirror support post 51, the hinge 35, the beam portions 36 and 37, and the support posts 39 and a bias voltage is supplied from the substrate-side bias electrode 11. The elevated address electrodes 32 and 33, the hinge 35, and the beam portions 36 and 37 are formed of the same layer having a predetermined pattern.

Spring tips 341, 342, 343, and 344 that regulate a pivot range of the mirror 50 by being brought into abutment against the mirror 50 when the mirror 50 is tilted are formed at the ends of the beam portions 36 and 37. Thus, contact between the mirror 50 and the elevated address electrodes 32 and 33 can be prevented. In this embodiment, as described later, the spring tips 341, 342, 343, and 344 regulate the pivot range of the mirror 50 of the unit mirror portion 5 which is adjacent to the unit mirror portion 5 to which the spring tips 341, 342, 343, and 344 belong.

As described above, in each of the plurality of unit mirror portions 5, the substrate-side bias electrode 11, the substrate-side address electrodes 12 and 13, the elevated address electrodes 32 and 33, the hinge 35, and the beam portions 36 and 37 are provided between the mirror 50 and the substrate 1 in a region that overlaps the mirror 50 in plan view.

Structure of Drive Element 30

The elevated address electrodes 32 and 33 constitute a drive element 30 that drives the mirror 50 to be tilted by generating an electrostatic force between the drive element 30 and the mirror 50 on both sides across the hinge 35. The substrate-side address electrodes 12 and 13 may also be constructed so as to drive the mirror 50 to be tilted by generating electrostatic forces between the substrate-side address electrodes 12 and 13 and the mirror 50. In this case, the drive element 30 is constituted by the elevated address electrodes 32 and 33 and the substrate-side address electrodes 12 and 13. The hinge 35 is a torsion hinge that turns when the mirror 50 is tilted so as to be attracted to the elevated address electrode 32 or the elevated address electrode 33 as illustrated in FIG. 5 by supply of drive voltages to the elevated address electrodes 32 and 33. When the attraction force for the mirror 50 is eliminated by stopping the supply of the drive voltages to the elevated address electrodes 32 and 33, the hinge 35 exerts a force for returning the mirror 50 to the steady posture in which the mirror 50 is parallel to the substrate 1.

Description of Pivot Operation and Other Features

In plan view, the hinge 35 overlaps a line connecting a first corner portion 50a of the mirror 50 which is located on one side X1 of the first direction X and another side Y2 of the second direction Y to a second corner portion 50b of the mirror 50 which is located on another side X2 of the first direction X and one side Y1 of the second direction Y. Thus, the rotation center axis (axis L) about which the mirror 50 pivots passes through the first corner portion 50a and the second corner portion 50b of the mirror 50 in plan view.

Thus, in each of the plurality of unit mirror portions 5, when the drive element 30 causes the mirror 50 to pivot in the direction CCW about the axis L so as to assume the ON posture in which the mirror 50 is tilted to the elevated address electrode 32 on one side, the mirror 50 reflects light L0 emitted from the light source unit 110 in an ON direction Lon toward the projection optical system 120.

When the mirror 50 pivots in the other direction CW about the axis L so as to assume the OFF posture in which the mirror 50 is tilted to the elevated address electrode 33 on the other side, the mirror 50 reflects the light L0 emitted from the light source unit 110 in an OFF direction Loff different from the ON direction Lon. Thus, the mirror 50 in the OFF posture does not reflect the light L0 from the light source unit 110 toward the projection optical system 120. In this embodiment, a light absorbing device 140 is provided in the OFF direction Loff.

The projection optical system 120 is arranged in a direction perpendicular to the mirror 50 in the steady posture (posture indicated by the two-dot chain line in FIG. 1). The direction from the mirror 50 to the projection optical system 120 is the ON direction Lon. The light source unit 110 radiates the light L0 onto the mirror 50 in a direction oblique to the ON direction Lon (direction perpendicular to the mirror 50) at an angle of −θe °. Thus, when the drive element 30 causes the mirror 50 to switch from the steady posture to the ON posture (posture indicated by the solid line in FIG. 1) in which the mirror 50 is tilted at −θa °, the mirror 50 reflects the light L0 from the light source unit 110 in the ON direction Lon toward the projection optical system 120. The angles θa and θe satisfy the following relationship.

$$\theta e = 2 \times \theta a$$

For example, θa ° is 12°. In this case, θe ° is 24°.

The light absorbing device 140 is arranged in a direction at an angle of +(2×θe) ° (OFF direction Loff) with respect to the ON direction Lon. Thus, when the drive element 30 causes the mirror 50 to switch from the steady posture to the OFF posture (posture indicated by the dotted line in FIG. 1) in which the mirror 50 is tilted at +θa °, the mirror 50 reflects the light L0 from the light source unit 110 in the OFF direction Loff toward the light absorbing device 140.

Therefore, in each of the plurality of unit mirror portions 5, when the posture of the mirror 50 is controlled, the light L0 from the light source unit 110 can be modulated and modulated light L1 can be projected from the projection optical system 120 onto the projection target 200 as image light.

Structures of Spring Tips 341, 342, 343, and 344

The structures of the spring tips 341, 342, 343, and 344 are described with reference to FIG. 4 and the like. In the following description, it is assumed as necessary that one of the plurality of unit mirror portions 5 is a first unit mirror portion 5a, that the unit mirror portion 5 which is adjacent to the first unit mirror portion 5a on the one side X1 of the first direction X is a second unit mirror portion 5b, and that the unit mirror portion 5 which is adjacent to the first unit mirror portion 5a on the other side X2 of the first direction X is a third unit mirror portion 5c. Further, it is assumed that the unit mirror portion 5 which is adjacent to the first unit mirror portion 5a on the one side Y1 of the second direction Y is a fourth unit mirror portion 5d, and that the unit mirror portion 5 which is adjacent to the first unit mirror portion 5a on the other side Y2 of the second direction Y is a fifth unit mirror portion 5e. In each of the plurality of unit mirror portions 5, the beam portions 36 and 37 of the adjacent unit mirror portions 5 are present at positions that do not overlap the mirror 50 in plan view.

As illustrated in FIG. 4, in this embodiment, to regulate the pivot range of the mirror 50 about the axis L, the spring tips 341, 342, 343, and 344 protrude toward positions that overlap the mirror 50 in plan view from the beam portions 36 and 37 that are supported by the substrate 1 while being spaced away from the mirror 50 and the substrate 1 at the positions that do not overlap the mirror 50 in plan view.

To achieve that structure, in this embodiment, in each of the plurality of unit mirror portions 5, each of the beam portions 36 and 37 extends along the edges of the mirror 50. Specifically, the beam portion 36 includes a first beam portion 361 extending in the second direction Y along the edge of the mirror 50 on the one side X1 of the first direction X, and a second beam portion 362 extending in the first direction X along the edge of the mirror 50 on the other side Y2 of the second direction Y. The beam portion 37 includes a third beam portion 371 extending in the second direction Y along the edge of the mirror 50 on the other side X2 of the first direction X, and a fourth beam portion 372 extending in the first direction X along the edge of the mirror 50 on the one side Y1 of the second direction Y. In each of the plurality of unit mirror portions 5, the first beam portion 361 and the second beam portion 362 are coupled to each other at a first bent portion 360 that overlaps the first corner portion 50a of the mirror 50 in plan view, and the third beam portion 371 and the fourth beam portion 372 are coupled to each other at a second bent portion 370 that overlaps the second corner portion 50b of the mirror 50 in plan view.

Each of the distal end of the first beam portion 361, the distal end of the second beam portion 362, the first bent portion 360 (proximal end of the first beam portion 361 and proximal end of the second beam portion 362), the distal end of the third beam portion 371, the distal end of the fourth beam portion 372, and the second bent portion 370 (proximal end of the third beam portion 371 and proximal end of the fourth beam portion 372) is supported on the substrate 1 by the support post 39. Thus, both ends of each of the first beam portion 361, the second beam portion 362, the third beam portion 371, and the fourth beam portion 372 are supported on the substrate 1 by the support posts 39.

In each of the plurality of unit mirror portions 5 constructed as described above, the spring tip 341 protrudes from the distal end of the third beam portion 371 to a position that overlaps, in plan view, the mirror 50 of the unit mirror portion 5 which is adjacent on the other side X2 of the first direction X, and the spring tip 342 protrudes from the distal end of the second beam portion 362 to a position that overlaps, in plan view, the mirror 50 of the unit mirror portion 5 which is adjacent on the other side Y2 of the second direction Y. Further, in each of the plurality of unit mirror portions 5, the spring tip 343 protrudes from the distal end of the first beam portion 361 to a position that overlaps, in plan view, the mirror 50 of the unit mirror portion 5 which is adjacent on the one side X1 of the first direction X, and the spring tip 344 protrudes from the distal end of the fourth beam portion 372 to a position that overlaps, in plan view, the mirror 50 of the unit mirror portion 5 which is adjacent on the one side Y1 of the second direction Y.

Therefore, in each of the plurality of unit mirror portions 5, the spring tip protrudes toward the position that overlaps the mirror 50 in plan view from any one of the beam portions 36 and 37 of the unit mirror portion 5 which is adjacent on the one side X1 of the first direction X, the unit mirror portion 5 which is adjacent on the other side X2 of the first direction X, the unit mirror portion 5 which is adjacent on the one side Y1 of the second direction Y, and the unit mirror portion 5 which is adjacent on the other side Y2 of the second direction Y. In this embodiment, in each of the plurality of unit mirror portions 5, the spring tips 341, 343, 342, and 344 protrude toward the positions that overlap the mirror 50 in plan view from the beam portion 37 of the unit mirror portion 5 which is adjacent on the one side X1 of the first direction X, the beam portion 36 of the unit mirror portion 5 which is adjacent on the other side X2 of the first direction X, the beam portion 36 of the unit mirror portion 5 which is adjacent on the one side Y1 of the second direction Y, and the beam portion 37 of the unit mirror portion 5 which is adjacent on the other side Y2 of the second direction Y, respectively.

That is, the spring tip 341 protrudes from the distal end of the third beam portion 371 of the second unit mirror portion 5b and the spring tip 342 protrudes from the distal end of the second beam portion 362 of the fourth unit mirror portion 5d to the positions that overlap the mirror 50 of the first unit mirror portion 5a in plan view. Further, the spring tip 343 protrudes from the distal end of the first beam portion 361 of the third unit mirror portion 5c and the spring tip 344 protrudes from the distal end of the fourth beam portion 372 of the fifth unit mirror portion 5e to the positions that overlap the mirror 50 of the first unit mirror portion 5a in plan view.

Thus, each of the spring tips 341 and 342 functions as a first spring tip that regulates the pivot range of the mirror 50 in the one direction by being brought into abutment against the mirror 50 when the mirror 50 has pivoted in the one direction about the axis L. Further, each of the spring tips 343 and 344 functions as a second spring tip that regulates the pivot range of the mirror 50 in the other direction by being brought into abutment against the mirror 50 when the mirror 50 has pivoted in the other direction about the axis L.

Each of the spring tips 341, 342, 343, and 344 protrudes from a part of each of the beam portions 36 and 37 which is supported by the support post 39. In each of the plurality of unit mirror portions 5, a distance da between the axis L and each of the spring tips 341, 342, 343, and 344 to be brought into abutment against the mirror 50 when the mirror 50 has pivoted is longer than a distance db between the axis L and a part of each of the elevated address electrodes 32 and 33 which is spaced farthest away from the axis L.

Main Advantages of this Embodiment

As described above, in the electro-optical device 100 of this embodiment, the pivot range of the mirror 50 is regulated by causing the spring tips 341, 342, 343, and 344 to protrude to the positions that overlap the mirror 50 in plan view from the beam portions 36 and 37 provided in the region that does not overlap the mirror 50 in plan view. Therefore, the degrees of freedom in terms of layout of the spring tips 341, 342, 343, and 344 and the like can be increased compared with the structure in which the spring tips of the beam portions provided in the region that overlaps the mirror 50 in plan view are brought into abutment against the mirror 50. Accordingly, advantages are attained, for example, in that the pivot range of the mirror 50 can be expanded.

The elevated address electrodes 32 and 33 are provided between the mirror 50 and the substrate-side address electrodes 12 and 13 provided on the substrate 1. Therefore, a great electrostatic force can be obtained between the mirror 50 and each of the elevated address electrodes 32 and 33. The elevated address electrodes 32 and 33 and the beam portions 36 and 37 are formed of the same layer, but the degrees of freedom in terms of layout of the spring tips 341, 342, 343, and 344 are high. Therefore, even when the elevated address electrodes 32 and 33 are provided over a wide range at appropriate positions, the spring tips 341, 342, 343, and 344 do not become obstructions. Even when the elevated address electrodes 32 and 33 are provided over a wide range, the distance da between the axis L and each of the spring tips 341, 342, 343, and 344 to be brought into abutment against the mirror 50 when the mirror 50 has pivoted is longer than the distance db between the axis L and a part of each of the elevated address electrodes 32 and 33 which is spaced farthest away from the axis L. Therefore, even when the beam portions 36 and 37 and the elevated address electrodes 32 and 33 are formed of the same layer, the pivot range of the mirror 50 can be regulated appropriately.

The first beam portion 361, the second beam portion 362, the third beam portion 371, and the fourth beam portion 372 that extend along the four edges of the mirror 50 are provided in each of the plurality of unit mirror portions 5. Therefore, the plurality of spring tips 341, 342, 343, and 344 can be caused to protrude from appropriate positions on the unit mirror portion 5 toward the adjacent unit mirror portions 5.

Each of the spring tips 341, 342, 343, and 344 protrudes from a part of each of the beam portions 36 and 37 which is supported by the support post 39. Thus, deformation of the beam portions 36 and 37 can be suppressed when the mirror 50 and the spring tips 341, 342, 343, and 344 are brought into abutment against each other.

Second Embodiment

Figure 6:
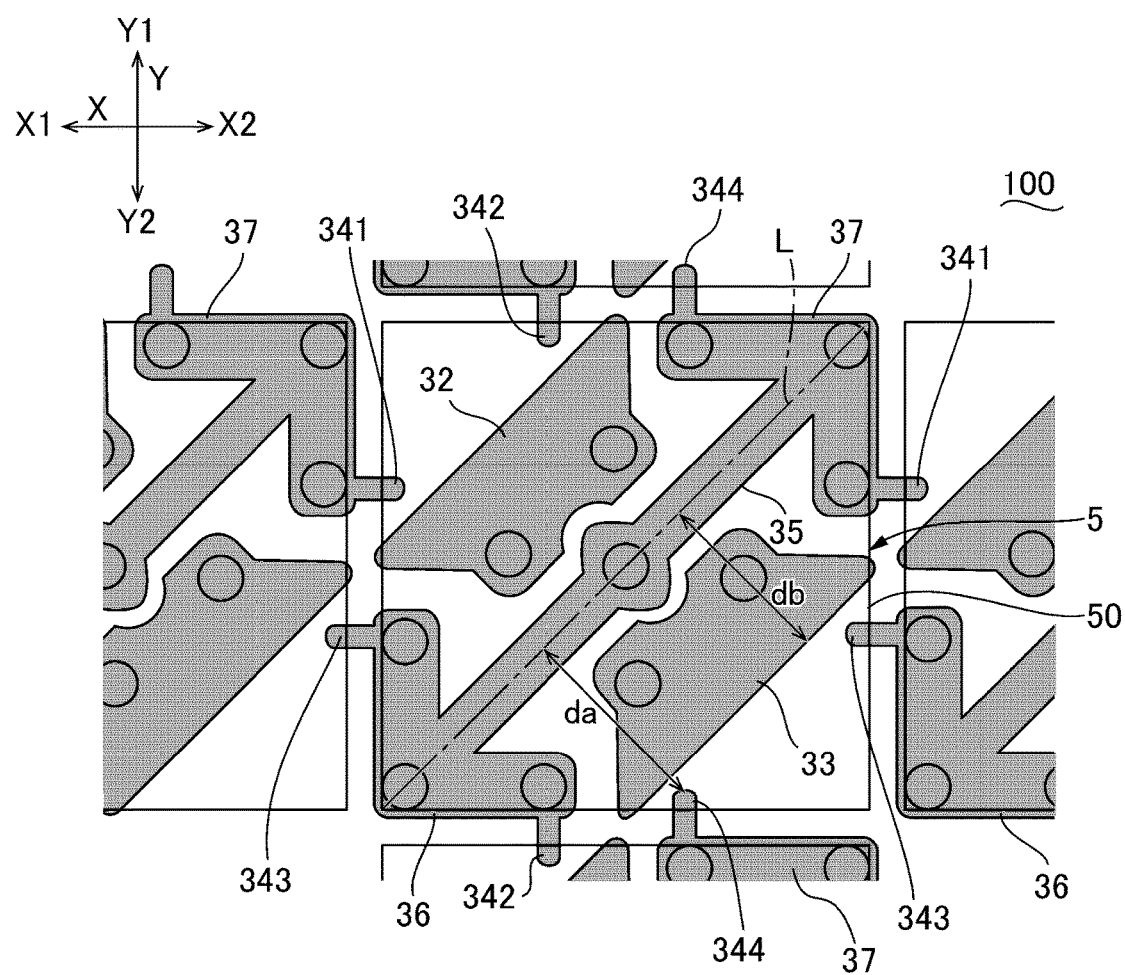
FIG. 6 is an explanatory view of elevated address electrodes and the like of an electro-optical device according to a second embodiment of the invention.

FIG. 6 is an explanatory view of elevated address electrodes 32 and 33 and the like of an electro-optical device 100 according to a second embodiment of the invention. FIG. 6 is a plan view illustrating the mirror 50 by a quadrangular contour line alone. The basic structures of this embodiment and other embodiments described later are similar to that of the first embodiment and therefore common parts are denoted by the same reference symbols to omit description thereof.

In the first embodiment, the planar shape of each of the elevated address electrodes 32 and 33 is a substantially rectangular shape. In this embodiment, as illustrated in FIG. 6, the shape of each of the elevated address electrodes 32 and 33 is a shape in which the side located away from the axis L is extended to positions that overlap the edges of the mirror 50. Therefore, the area of each of the elevated address electrodes 32 and 33 is larger than in the first embodiment. Thus, the electrostatic force to be supplied between the mirror 50 and each of the elevated address electrodes 32 and 33 can be increased. In this embodiment, similarly to the first embodiment, the beam portions 36 and 37 and the elevated address electrodes 32 and 33 are formed of the same layer, but the distance da between the axis L and each of the spring tips 341, 342, 343, and 344 to be brought into abutment against the mirror 50 when the mirror 50 has pivoted is longer than the distance db between the axis L and a part of each of the elevated address electrodes 32 and 33 which is spaced farthest away from the axis L. Thus, the pivot range of the mirror 50 can be regulated appropriately.

Third Embodiment

In the first embodiment, the spring tips 341, 342, 343, and 344 protrude from the distal end of the third beam portion 371, the distal end of the second beam portion 362, the distal end of the first beam portion 361, and the distal end of the fourth beam portion 372, respectively. The spring tips 341, 342, 343, and 344 may protrude from middle positions in extending directions of the third beam portion 371, the second beam portion 362, the first beam portion 361, and the fourth beam portion 372, respectively. In this case, each of the spring tips 341, 342, 343, and 344 protrudes from a part of each of the beam portions 36 and 37 which is located between two support posts 39. Thus, deformation of the beam portions 36 and 37 can be suppressed when the mirror 50 and the spring tips 341, 342, 343, and 344 are brought into abutment against each other.

Fourth Embodiment

Figure 7:
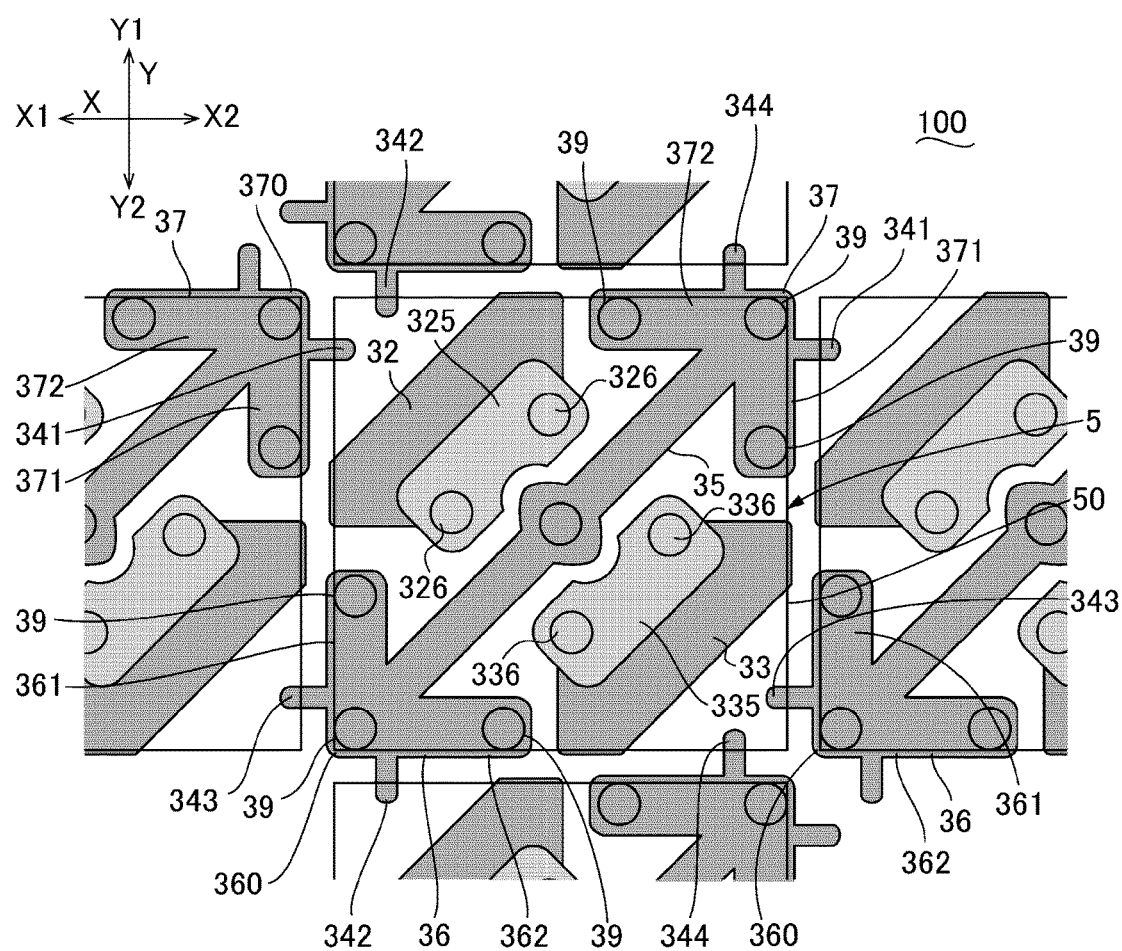
FIG. 7 is an explanatory view of spring tips and the like of an electro-optical device according to a fourth embodiment of the invention.

FIG. 7 is an explanatory view of spring tips 341, 342, 343, and 344 and the like of an electro-optical device 100 according to a fourth embodiment of the invention. FIG. 7 is a plan view illustrating the mirror 50 by a quadrangular contour line alone.

As illustrated in FIG. 7, in this embodiment, the spring tips 341, 342, 343, and 344 protrude from the proximal end of the third beam portion 371 (second bent portion 370), the proximal end of the second beam portion 362 (first bent portion 360), the proximal end of the first beam portion 361 (first bent portion 360), and the proximal end of the fourth beam portion 372 (second bent portion 370), respectively. Thus, each of the spring tips 341, 342, 343, and 344 protrudes from a part of each of the beam portions 36 and 37 where two support posts 39 are provided. Therefore, deformation of the beam portions 36 and 37 can be suppressed when the mirror 50 and the spring tips 341, 342, 343, and 344 are brought into abutment against each other. Further, the spring tips 341, 342, 343, and 344 are provided at positions spaced farther away from the axis L than in the first embodiment and other embodiments, and hence the pivot range of the mirror 50 is wider than in the first embodiment.

In the first embodiment, the elevated address electrodes 32 and 33 are provided in a single stage alone. In this embodiment, substantially quadrangular elevated address electrodes 325 and 335 are provided between the elevated address electrodes 32 and 33 and the mirror 50. The elevated address electrodes 32 and 33 and the elevated address electrodes 325 and 335 are electrically connected to each other via electrode support posts 326 and 336, respectively. Thus, the electrostatic force to be supplied between the mirror 50 and each of the elevated address electrodes (elevated address electrodes 32 and 33 and elevated address electrodes 325 and 335) can be increased. In this case, the elevated address electrodes 32 and 33 are lower-stage elevated address electrodes and the elevated address electrodes 325 and 335 are upper-stage elevated address electrodes. Further, the elevated address electrodes 32 and 33 (lower-stage elevated address electrodes) project farther away from the axis L than the elevated address electrodes 325 and 335 (upper-stage elevated address electrodes). In this embodiment, the beam portions 36 and 37 are formed of the same layer as that of the lower-stage elevated address electrodes 32 and 33.

Fifth Embodiment

Figure 8:
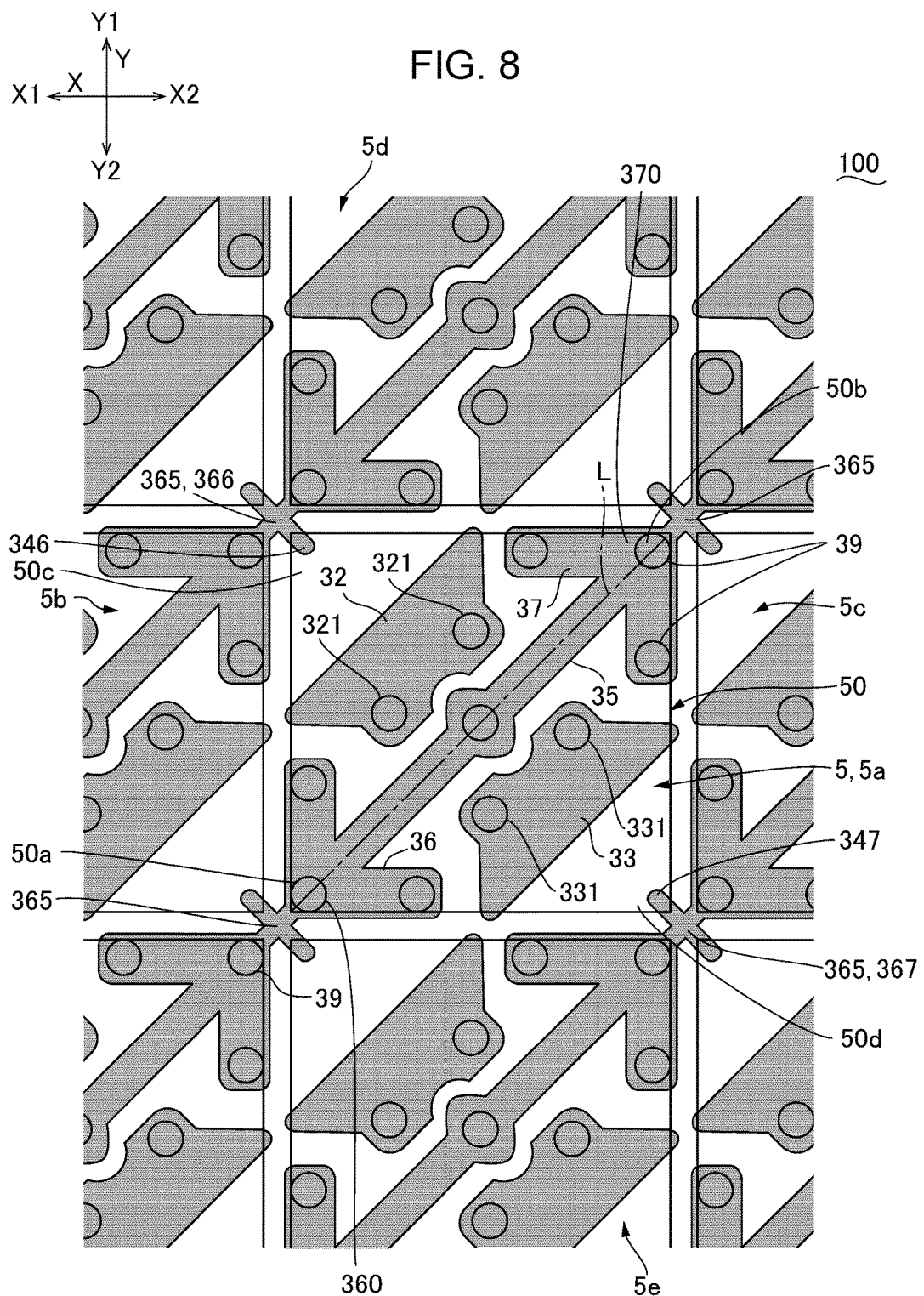
FIG. 8 is an explanatory view of spring tips and the like of an electro-optical device according to a fifth embodiment of the invention.

FIG. 8 is an explanatory view of spring tips 346 and 347 and the like of an electro-optical device 100 according to a fifth embodiment of the invention. FIG. 8 is a plan view illustrating the mirror 50 by a quadrangular contour line alone.

In this embodiment, as illustrated in FIG. 8, in the unit mirror portions 5 arranged in a direction along the axis L, the beam portion 36 and the beam portion 37 are coupled to each other via a coupling portion 365, and the spring tip 346 and the spring tip 347 protrude from the coupling portion 365 in opposite directions. Thus, the spring tip 346 and the spring tip 347 protrude from the beam portion 36 and the beam portion 37 via the coupling portion 365 in opposite directions. The spring tip 346 protrudes from the coupling portion 365 toward the other side X2 of the first direction X and the other side Y2 of the second direction Y, and the spring tip 347 protrudes from the coupling portion 365 toward the one side X1 of the first direction X and the one side Y1 of the second direction Y.

More specifically, in each of the plurality of unit mirror portions 5, the spring tip 346 protrudes toward a position that overlaps the mirror 50 in plan view from the coupling portion 365 (first coupling portion 366) that couples the second bent portion 370 of the unit mirror portion 5 which is adjacent on the one side X1 of the first direction X to the first bent portion 360 of the unit mirror portion 5 which is adjacent on the one side Y1 of the second direction Y. This spring tip 346 is a first spring tip that regulates the pivot range of the mirror 50 in the one direction about the axis L by being brought into abutment against a third corner portion 50c of the mirror 50 which is located on the one side X1 of the first direction X and the one side Y1 of the second direction Y.

In each of the plurality of unit mirror portions 5, the spring tip 347 protrudes toward a position that overlaps the mirror 50 in plan view from the coupling portion 365 (second coupling portion 367) that couples the first bent portion 360 of the unit mirror portion 5 which is adjacent on the other side X2 of the first direction X to the second bent portion 370 of the unit mirror portion 5 which is adjacent on the other side Y2 of the second direction Y. This spring tip 347 is a second spring tip that regulates the pivot range of the mirror 50 in the other direction about the axis L by being brought into abutment against a fourth corner portion 50d of the mirror 50 which is located on the other side X2 of the first direction X and the other side Y2 of the second direction Y.

The width of the coupling portion 365 (width of the first coupling portion 366 and width of the second coupling portion 367) is smaller than the width of the hinge 35. However, each of the first coupling portion 366 and the second coupling portion 367 is provided between two support posts 39, and therefore deformation of the coupling portions 365 (first coupling portion 366 and second coupling portion 367) of the beam portions 36 and 37 can be suppressed when the mirror 50 and each of the spring tip 346 and the spring tip 347 are brought into abutment against each other.

Sixth Embodiment

Figure 9:
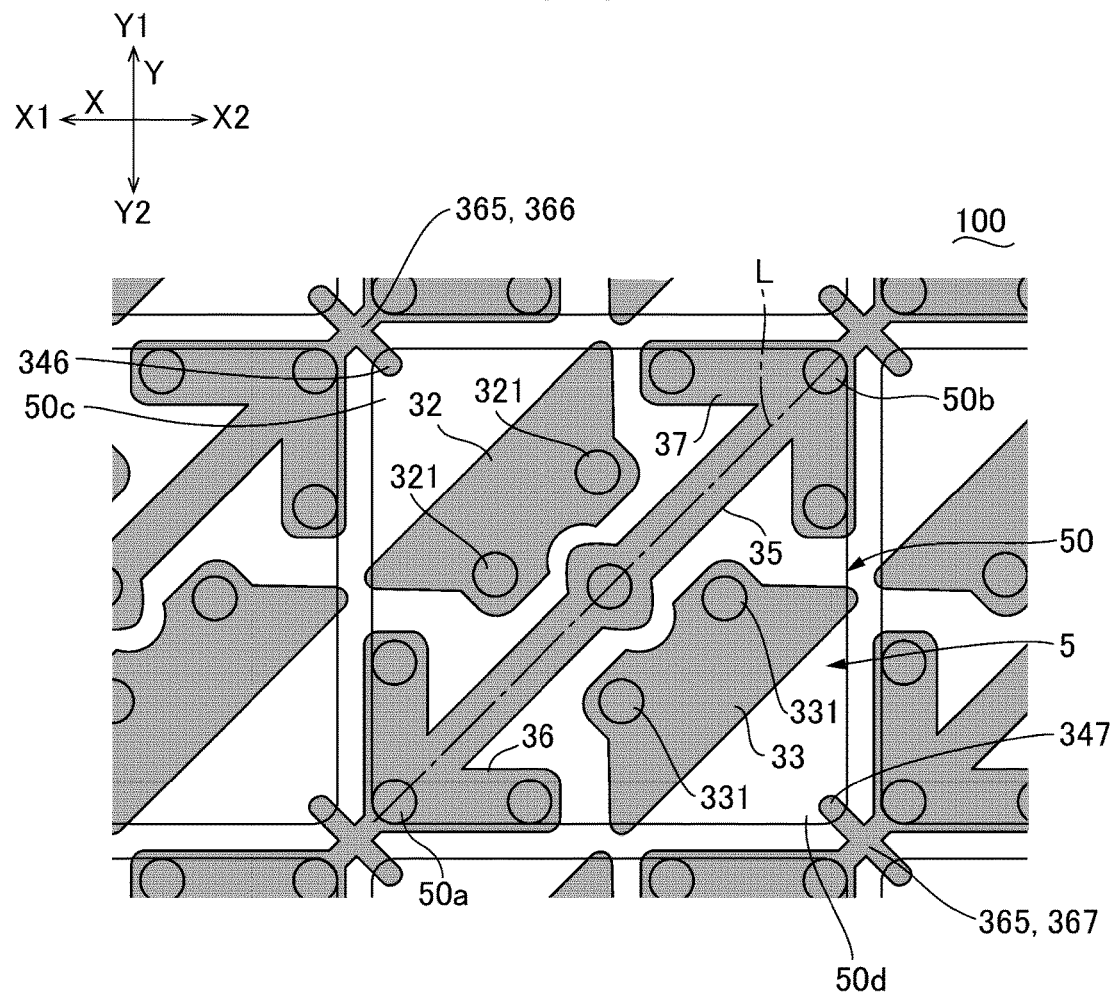
FIG. 9 is an explanatory view of a mirror of the electro-optical device according to a sixth embodiment of the invention.

FIG. 9 is an explanatory view of a mirror 50 of an electro-optical device 100 according to a sixth embodiment of the invention. FIG. 9 is a plan view illustrating the mirror 50 by a quadrangular contour line alone. The basic structure of this embodiment is similar to that of the fifth embodiment and therefore common parts are denoted by the same reference symbols to omit description thereof.

In the fifth embodiment, each of the third corner portion 50c and the fourth corner portion 50d of the mirror 50 is sharp at an angle of 90°. In this embodiment, as illustrated in FIG. 9, each of the third corner portion 50c and the fourth corner portion 50d of the mirror 50 is chamfered into a round shape. Therefore, deformation of the corner portions (third corner portion 50c and fourth corner portion 50d) of the mirror 50 and the spring tips (spring tip 346 and spring tip 347) can be suppressed. In this embodiment, each of the first corner portion 50a and the second corner portion 50b of the mirror 50 is chamfered into a round shape similarly to the third corner portion 50c and the fourth corner portion 50d.

Seventh Embodiment

Figure 10:
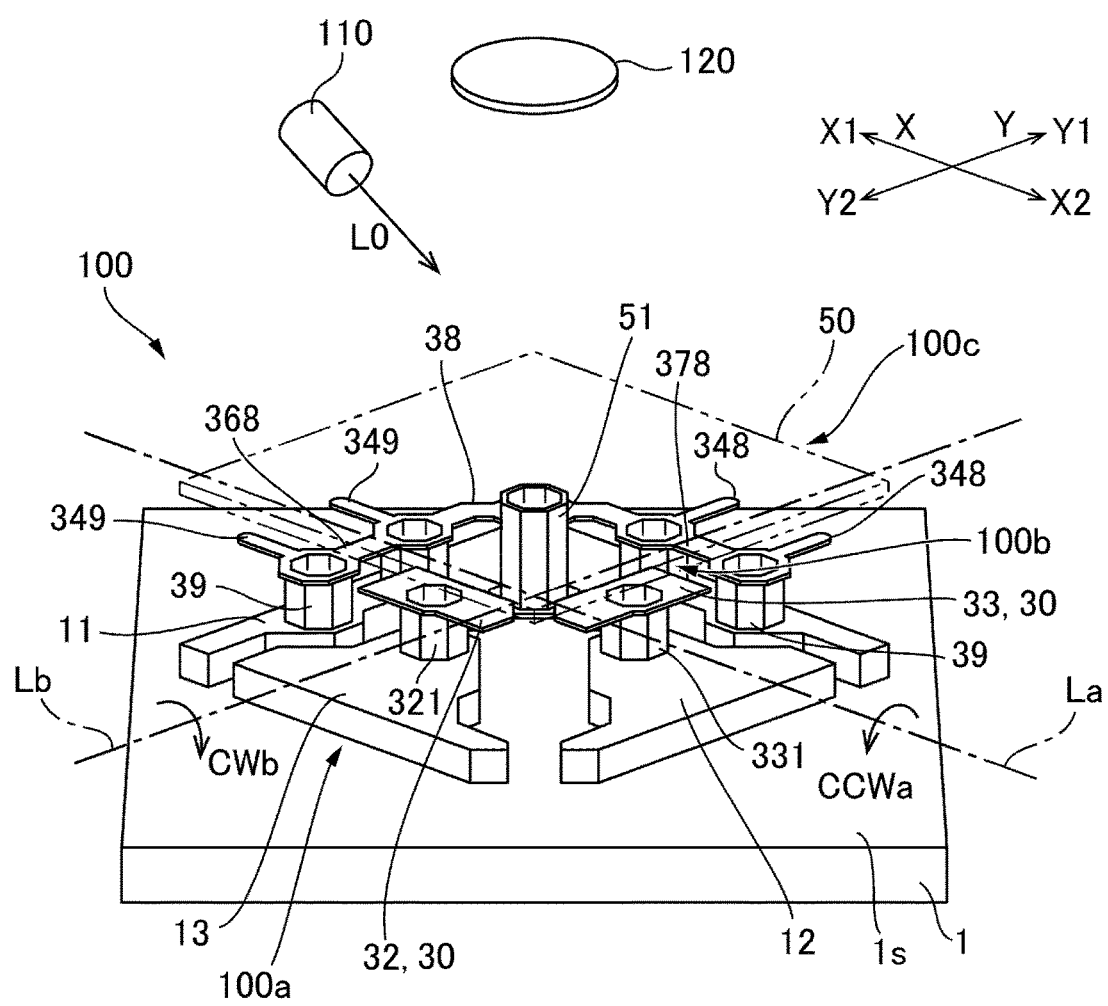
FIG. 10 is a partially enlarged perspective view illustrating an electro-optical device according to a seventh embodiment of the invention.
Figure 11:
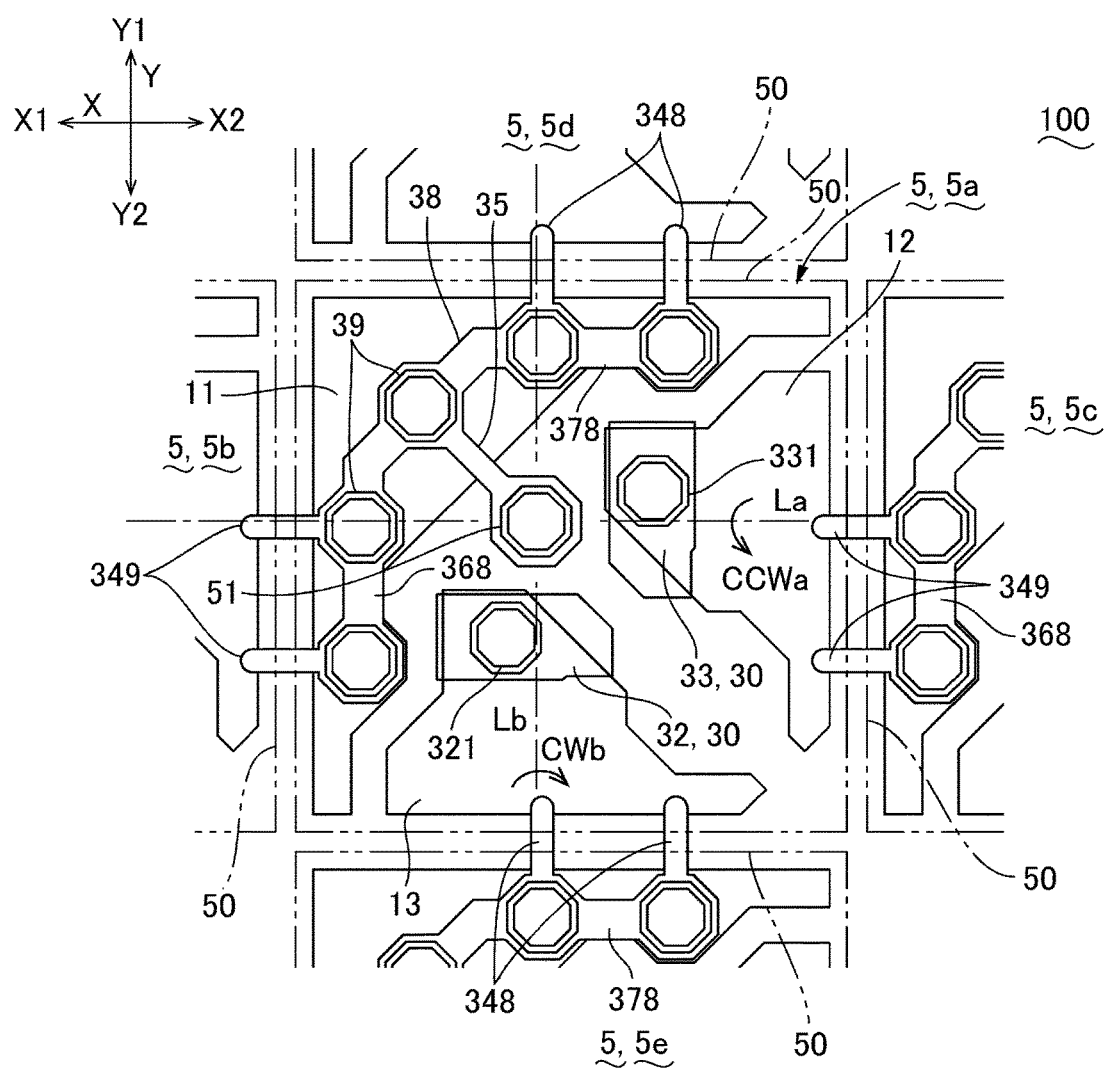
FIG. 11 is a plan view of a drive element and the like illustrated in FIG. 10.
Figure 12:
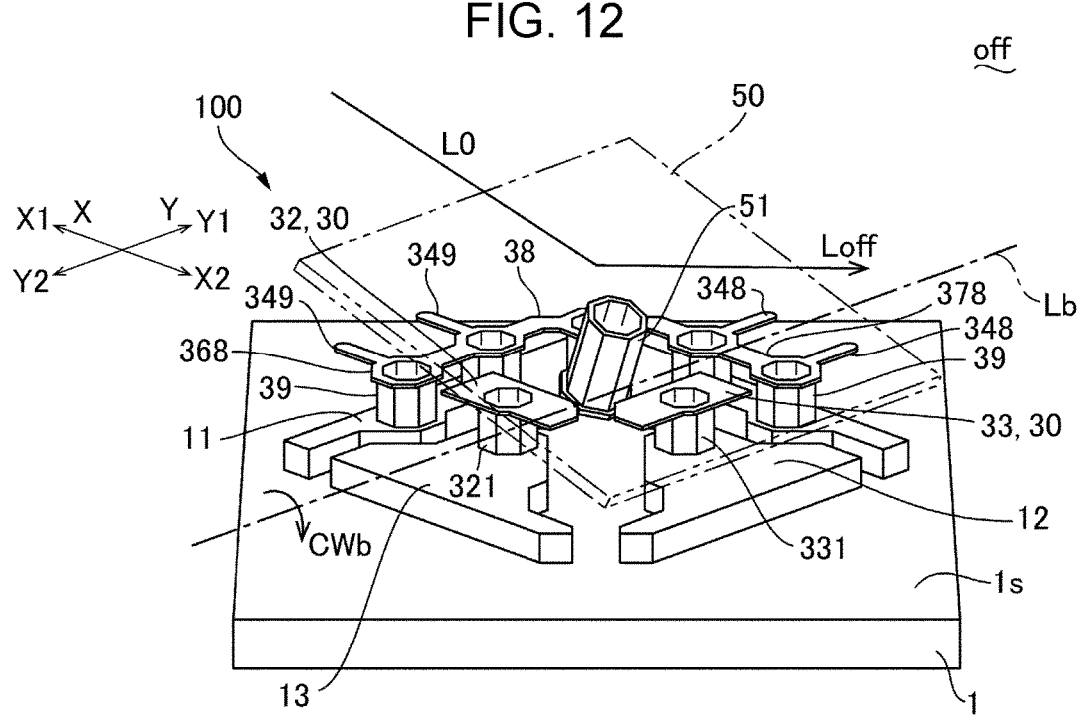
FIG. 12 is an explanatory view of a case in which a mirror is driven in the electro-optical device illustrated in FIG. 10.
Figure 12:
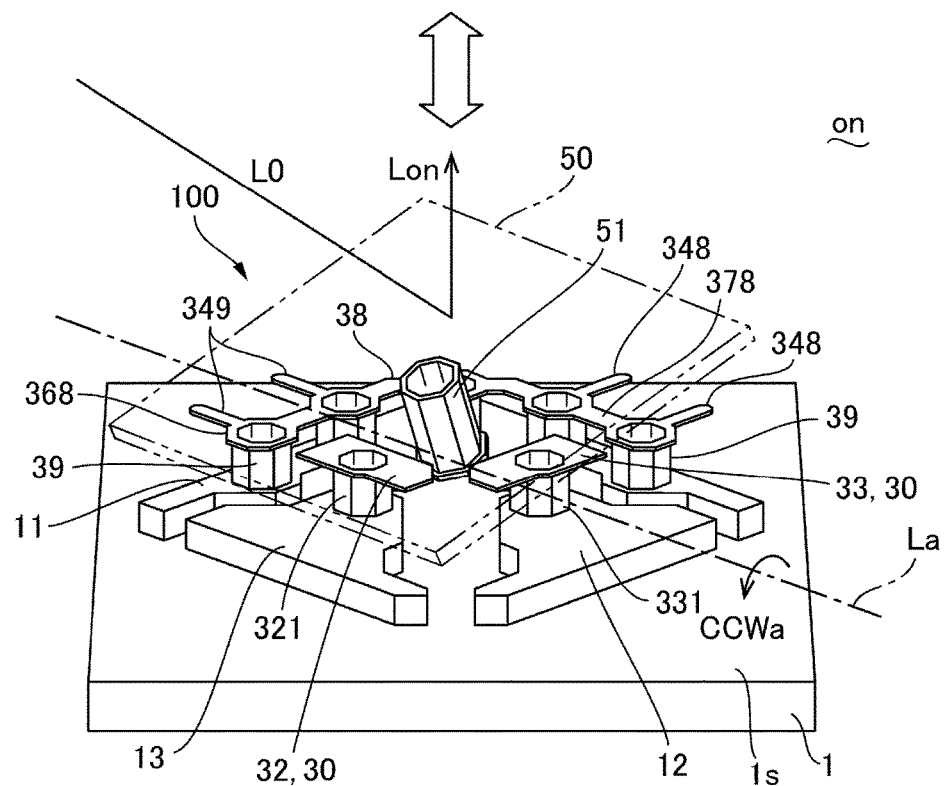

FIG. 10 is a partially enlarged perspective view illustrating an electro-optical device 100 according to a seventh embodiment of the invention. FIG. 10 illustrates a steady posture. FIG. 11 is a plan view of the drive element 30 and the like illustrated in FIG. 10. FIG. 12 is an explanatory view of a case in which the mirror 50 is driven in the electro-optical device 100 illustrated in FIG. 10. FIG. 12 illustrates an ON posture of the mirror 50 that is tilted in a direction CCWa about a first axis La and an OFF posture of the mirror 50 that is tilted in a direction CWb about a second axis Lb. FIG. 10 and FIG. 12 illustrate the mirror 50 by a two-dot chain line.

In the electro-optical device 100 according to each of the first to sixth embodiments, the mirror 50 pivots about the single axis L. In this embodiment, as described below with reference to FIG. 10, FIG. 11, and FIG. 12, the first axis La extending in the first direction X while overlapping the mirror 50 in plan view and the second axis Lb extending in the second direction Y while overlapping the mirror 50 in plan view are set for the mirror 50. In this embodiment, the mirror 50 pivots in the direction CCWa about the first axis La so as to assume the ON posture, and also pivots in the direction CWb about the second axis Lb so as to assume the OFF posture.

As illustrated in FIG. 10, the electro-optical device 100 includes the first level portion 100a including, for example, the substrate-side bias electrode 11 and the substrate-side address electrodes 12 and 13 formed on the surface is of the substrate 1, the second level portion 100b including the elevated address electrodes 32 and 33, the hinge 35, a first beam portion 368, and a second beam portion 378, and the third level portion 100c including the mirror 50. The elevated address electrodes 32 and 33 are electrically connected to the substrate-side address electrodes 12 and 13 via the electrode support posts 321 and 331 on both sides of the hinge 35, respectively.

The first beam portion 368 extends in the second direction Y along the edge of the mirror 50 on the one side X1 of the first direction X, and the second beam portion 378 extends in the first direction X along the edge of the mirror 50 on the one side Y1 of the second direction Y. The first beam portion 368 and the second beam portion 378 are coupled to each other on the one side X1 of the first direction X and the one side Y1 of the second direction Y by a bent portion 38. The first beam portion 368, the second beam portion 378, and the bent portion 38 are supported by the substrate-side bias electrode 11 via the support posts 39 provided at positions spaced away from each other in extending directions. The hinge 35 protrudes from the bent portion 38 toward the other side X2 of the first direction X and the other side Y2 of the second direction Y, and the mirror 50 is supported on the distal end of the hinge 35 via the mirror support post 51.

The elevated address electrode 32 is located on the other side of the second direction Y with respect to the distal end of the hinge 35, and the elevated address electrode 33 is located on the other side of the first direction X with respect to the distal end of the hinge 35. The elevated address electrodes 32 and 33 constitute the drive element 30 that drives the mirror 50 to be tilted by generating an electrostatic force between the drive element 30 and the mirror 50.

In the electro-optical device 100 constructed as described above, when the potentials of the mirror 50, the elevated address electrode 32, and the elevated address electrode 33 are controlled to generate electrostatic forces between the elevated address electrodes 32 and 33 and the mirror 50, the hinge 35 can turn to achieve, as illustrated in FIG. 12, the ON posture in which the mirror 50 is tilted in the direction CCWa about the first axis La and the OFF posture in which the mirror 50 is tilted in the direction CWb about the second axis Lb. In the ON posture, the mirror 50 reflects the light L0 from the light source unit 110 in the ON direction Lon toward the projection optical system 120. In the OFF posture, the mirror 50 reflects the light L0 from the light source unit 110 in the OFF direction Loff toward the light absorbing device 140.

In this embodiment, similarly to the first embodiment and other embodiments, to regulate the pivot range of the mirror 50 about the first axis La and the second axis Lb, two spring tips 349 and 348 protrude toward positions that overlap the mirror 50 in plan view from the first beam portion 368 and the second beam portion 378 that are provided at positions that do not overlap the mirror 50 in plan view, respectively.

More specifically, two spring tips 348 protrude from the second beam portion 378 to the one side Y1 of the second direction Y. Each of the two spring tips 348 overlaps, in plan view, the mirror 50 of the unit mirror portion 5 which is located on the one side Y1 of the second direction Y. Further, two spring tips 349 protrude from the first beam portion 368 to the one side X1 of the first direction X. Each of the two spring tips 349 overlaps, in plan view, the mirror 50 of the unit mirror portion 5 which is located on the one side X1 of the first direction X. Thus, in each of the plurality of unit mirror portions 5, the spring tips 348 protrude toward the positions that overlap the mirror 50 of the first unit mirror portion 5a in plan view from the second beam portion 378 of the fifth unit mirror portion 5e which is adjacent on the other side Y2 of the second direction Y, and the spring tips 349 protrude toward the positions that overlap the mirror 50 of the first unit mirror portion 5a in plan view from the first beam portion 368 of the third unit mirror portion 5c which is adjacent on the other side X2 of the first direction X. The spring tip 348 is a first spring tip that regulates the pivot range of the mirror 50 in the direction CCWa about the first axis La, and the spring tip 349 is a second spring tip that regulates the pivot range of the mirror 50 in the direction CWb about the second axis Lb.

In this embodiment, the two spring tips 348 protrude from the distal end and the middle position in the extending direction of the second beam portion 378 where the support posts 39 are provided, and the two spring tips 349 protrude from the distal end and the middle position in the extending direction of the first beam portion 368 where the support posts 39 are provided.

Also in the structure described above, advantages similar to those of the first embodiment and other embodiments are attained, for example, in that the degrees of freedom in terms of layout of the spring tips 348 and 349 and the like can be increased.

The entire disclosure of Japanese Patent Application No. 2016-102176, filed May 23, 2016 is expressly incorporated by reference herein.

What is claimed is:

1. An electro-optical device, comprising:
    a first mirror being positioned above a surface of a substrate and modulating light;
    a torsion hinge being positioned between the first mirror and the substrate and supporting the first mirror such that the first mirror is pivotable about an axis;
    a beam portion being disposed between the first mirror and the substrate at a position that does not overlap a second mirror in plan view, and being supported by the substrate while being spaced away from the second mirror and the substrate; and
    a spring tip protruding from the beam portion toward a position that overlaps the second mirror in plan view, and regulates a pivot range of the second mirror.

2. The electro-optical device according to claim 1, further comprising:
    an address electrode being provided between the first mirror and the substrate at a position that overlaps the first mirror in plan view, and supplying an electrostatic force between the address electrode and the first mirror to pivot the first mirror about the axis; and a bias electrode being provided between the torsion hinge and the substrate, and supplying a bias voltage to the first mirror via the torsion hinge.

3. The electro-optical device according to claim 2, wherein the torsion hinge and the beam portion are formed of the same layer.

4. The electro-optical device according to claim 2, wherein the address electrode includes:

a substrate-side address electrode that is provided on the substrate; and an elevated address electrode that is provided between the substrate-side address electrode and the first mirror.

5. The electro-optical device according to claim 4, wherein the beam portion and the elevated address electrode are formed of the same layer, and wherein a distance between the axis and the spring tip is longer than a distance between the axis and a part of the elevated address electrode which is spaced farthest away from the axis.

6. The electro-optical device according to claim 4, wherein the elevated address electrode includes:

a lower-stage elevated address electrode that is provided between the substrate-side address electrode and the first mirror; and an upper-stage elevated address electrode that is provided between the lower-stage elevated address electrode and the first mirror.

7. The electro-optical device according to claim 1, wherein the first mirror, the torsion hinge, and the beam portion are provided in each of a plurality of unit mirror portions that are arranged in a first direction and a second direction intersecting the first direction, wherein, in each of the plurality of unit mirror portions, the beam portion of an adjacent unit mirror portion is present at a position that does not overlap the first mirror in plan view, and wherein, in each of the plurality of unit mirror portions, the spring tip protrudes toward a position that overlaps the first mirror in plan view from any one of the beam portion provided in a unit mirror portion which is adjacent on one side of the first direction, the beam portion provided in a unit mirror portion which is adjacent on another side of the first direction, the beam portion provided in a unit mirror portion which is adjacent on one side of the second direction, and the beam portion provided in a unit mirror portion which is adjacent on another side of the second direction.

8. The electro-optical device according to claim 7, wherein, in plan view, the axis passes through a first corner portion of the first mirror which is located on the one side of the first direction and the another side of the second direction and a second corner portion of the first mirror which is located on the another side of the first direction and the one side of the second direction.

9. The electro-optical device according to claim 8, wherein the beam portion includes:

a first beam portion extending in the second direction along an edge of the first mirror on the one side of the first direction;

a second beam portion extending in the first direction along an edge of the first mirror on the another side of the second direction;

a third beam portion extending in the second direction along an edge of the first mirror on the another side of the first direction; and a fourth beam portion extending in the first direction along an edge of the first mirror on the one side of the second direction.

10. The electro-optical device according to claim 9, wherein each of the first beam portion, the second beam portion, the third beam portion, and the fourth beam portion is supported on the substrate by support posts at least at two positions spaced away from each other in an extending direction, and wherein the spring tip protrudes from a part of each of the first beam portion, the second beam portion, the third beam portion, and the fourth beam portion which is located between the support posts or is supported by the support post.

11. The electro-optical device according to claim 9, wherein the first beam portion and the second beam portion are coupled to each other at a first bent portion that overlaps the first corner portion in plan view, and the third beam portion and the fourth beam portion are coupled to each other at a second bent portion that overlaps the second corner portion in plan view, wherein each of the first beam portion, the second beam portion, the first bent portion, the third beam portion, the fourth beam portion, and the second bent portion is supported on the substrate by a support post, and wherein the spring tip protrudes from a part located between the support post of the first beam portion and the support post of the first bent portion, a part located between the support post of the second beam portion and the support post of the first bent portion, a part located between the support post of the third beam portion and the support post of the second bent portion, a part located between the support post of the fourth beam portion and the support post of the second bent portion, or a part supported by the support post.

12. The electro-optical device according to claim 10, wherein each of the plurality of unit mirror portions include:

a first spring tip that regulates, as the spring tip, a pivot range of a respective mirror in one direction about the axis protrudes toward the position that overlaps a different mirror in plan view from each of the third beam portion of the unit mirror portion which is adjacent on the one side of the first direction and the second beam portion of the unit mirror portion which is adjacent on the one side of the second direction, and a second spring tip that regulates, as the spring tip, a pivot range of the respective mirror in another direction about the axis protrudes toward the position that overlaps the different mirror in plan view from each of the first beam portion of the unit mirror portion which is adjacent on the another side of the first direction and the fourth beam portion of the unit mirror portion which is adjacent on the another side of the second direction.

13. The electro-optical device according to claim 11, wherein each of the plurality of unit mirror portions include:

a first spring tip that regulates, as the spring tip, a pivot range of a respective mirror in one direction about the axis protrudes toward the position that overlaps a different mirror in plan view from each of the second bent portion of the unit mirror portion which is adjacent on the one side of the first direction and the first bent portion of the unit mirror portion which is adjacent on the one side of the second direction, and a second spring tip that regulates, as the spring tip, a pivot range of the respective mirror in another direction about the axis protrudes toward the position that overlaps the different mirror in plan view from each of the first bent portion of the unit mirror portion which is adjacent on the another side of the first direction and the second bent portion of the unit mirror portion which is adjacent on the another side of the second direction.

14. The electro-optical device according to claim 11, wherein each of the plurality of unit first mirror portions include:
a first spring tip that regulates, as the spring tip, a pivot range of a respective mirror in one direction about the axis protrudes toward the position that overlaps a different mirror in plan view from a first coupling portion that couples the second bent portion of the unit mirror portion which is adjacent on the one side of the first direction to the first bent portion of the unit mirror portion which is adjacent on the one side of the second direction, and a second spring tip that regulates, as the spring tip, a pivot range of the respective mirror in another direction about the axis protrudes toward the position that overlaps the different mirror in plan view from a second coupling portion that couples the first bent portion of the unit mirror portion which is adjacent on the another side of the first direction to the second bent portion of the unit mirror portion which is adjacent on the another side of the second direction.

15. The electro-optical device according to claim 14, wherein each of a width of the first coupling portion and a width of the second coupling portion is smaller than a width of the torsion hinge.

16. The electro-optical device according to claim 14, wherein each of a third corner portion of the first mirror which is located on the one side of the first direction and the one side of the second direction and a fourth corner portion of the first mirror which is located on the another side of the first direction and the another side of the second direction is chamfered into a round shape.

17. The electro-optical device according to claim 7, wherein the axis includes:
a first axis extending in the first direction while overlapping the first mirror in plan view; and
a second axis extending in the second direction while overlapping the first mirror in plan view.

18. The electro-optical device according to claim 17, wherein the beam portion includes:

a first beam portion extending in the second direction along an edge of the first mirror on the one side of the first direction; and a second beam portion extending in the first direction along an edge of the first mirror on the one side of the second direction.

19. The electro-optical device according to claim 18, wherein each of the first beam portion and the second beam portion is supported on the substrate by support posts at least at two positions spaced away from each other in an extending direction, and wherein the spring tip protrudes from a part of each of the first beam portion and the second beam portion which is located between the two support posts or is supported by the support post.

20. The electro-optical device according to claim 18, wherein, in each of the plurality of unit first mirror portions, a first spring tip that regulates, as the spring tip, a pivot range of the first mirror in one direction about the first axis protrudes toward the position that overlaps the first mirror in plan view from the second beam portion of the unit first mirror portion which is adjacent on the another side of the second direction, and a second spring tip that regulates, as the spring tip, a pivot range of the first mirror in one direction about the second axis protrudes toward the position that overlaps the first mirror in plan view from the first beam portion of the unit first mirror portion which is adjacent on the another side of the first direction.

21. An electronic device, comprising:
the electro-optical device according to claim 1;
a light source unit that radiates light onto the first mirror; and
a projection optical system that projects modulated light output from the electro-optical device.

22. An electro-optical device, comprising:
a first mirror being positioned above a surface of a substrate and modulating light;
a torsion hinge being positioned between the first mirror and the substrate and supporting the first mirror such that the first mirror is pivotable about an axis;
a beam portion being disposed between the first mirror and the substrate, the beam portion having a region that does not overlap the first mirror in plan view, and the beam portion being supported by the substrate while being spaced away from the first mirror and the substrate; and
a spring tip protruding from the beam portion toward a position that overlaps a second mirror in plan view, and regulates a pivot range of the second mirror.

* * * * *